Jan. 27, 1942.  G. K. MULHOLLAND  2,271,304
TRAILER UNIT
Filed Jan. 8, 1940   3 Sheets-Sheet 1
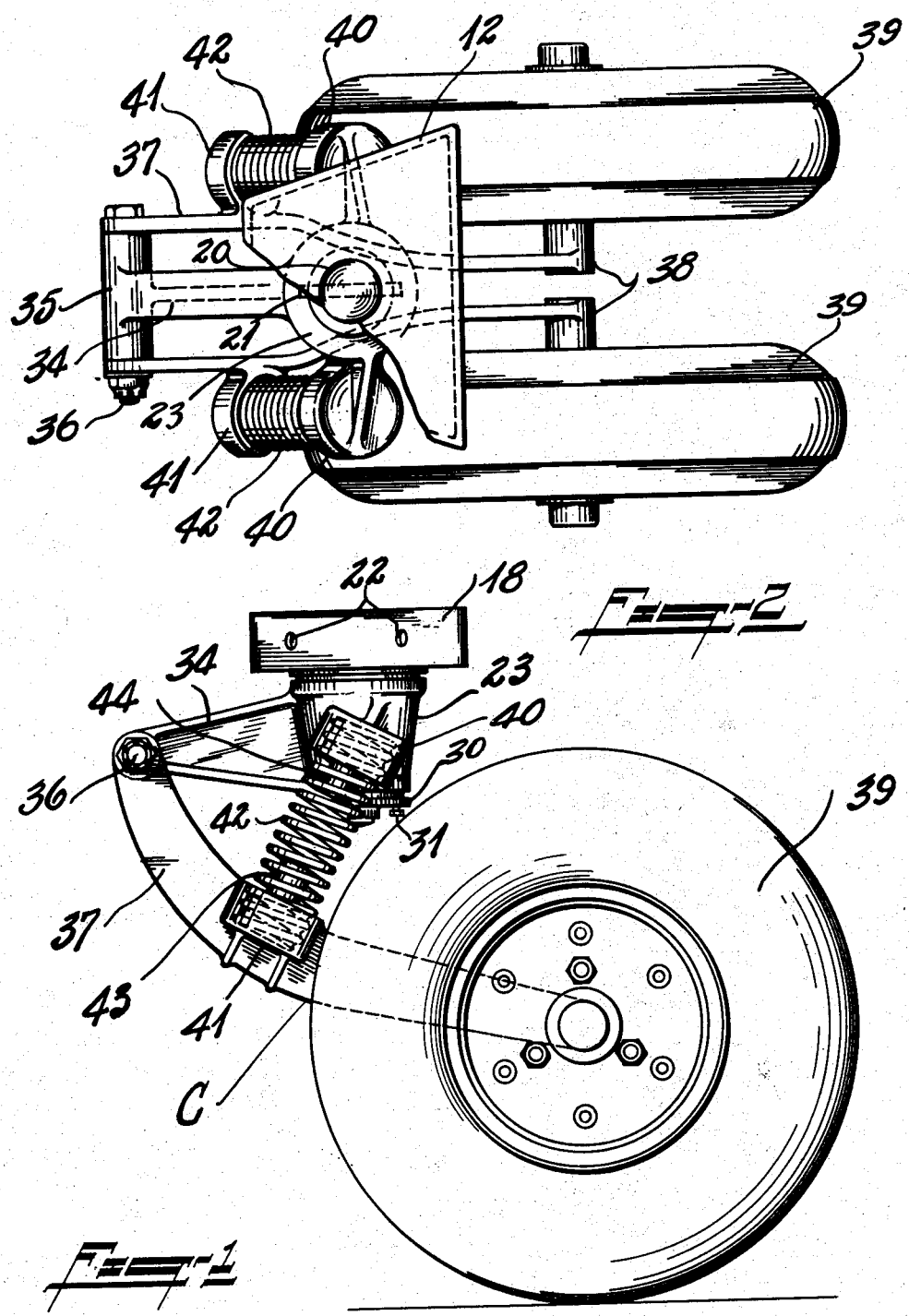
INVENTOR
George K. Mulholland.
BY Frank E. Karman.
ATTORNEY

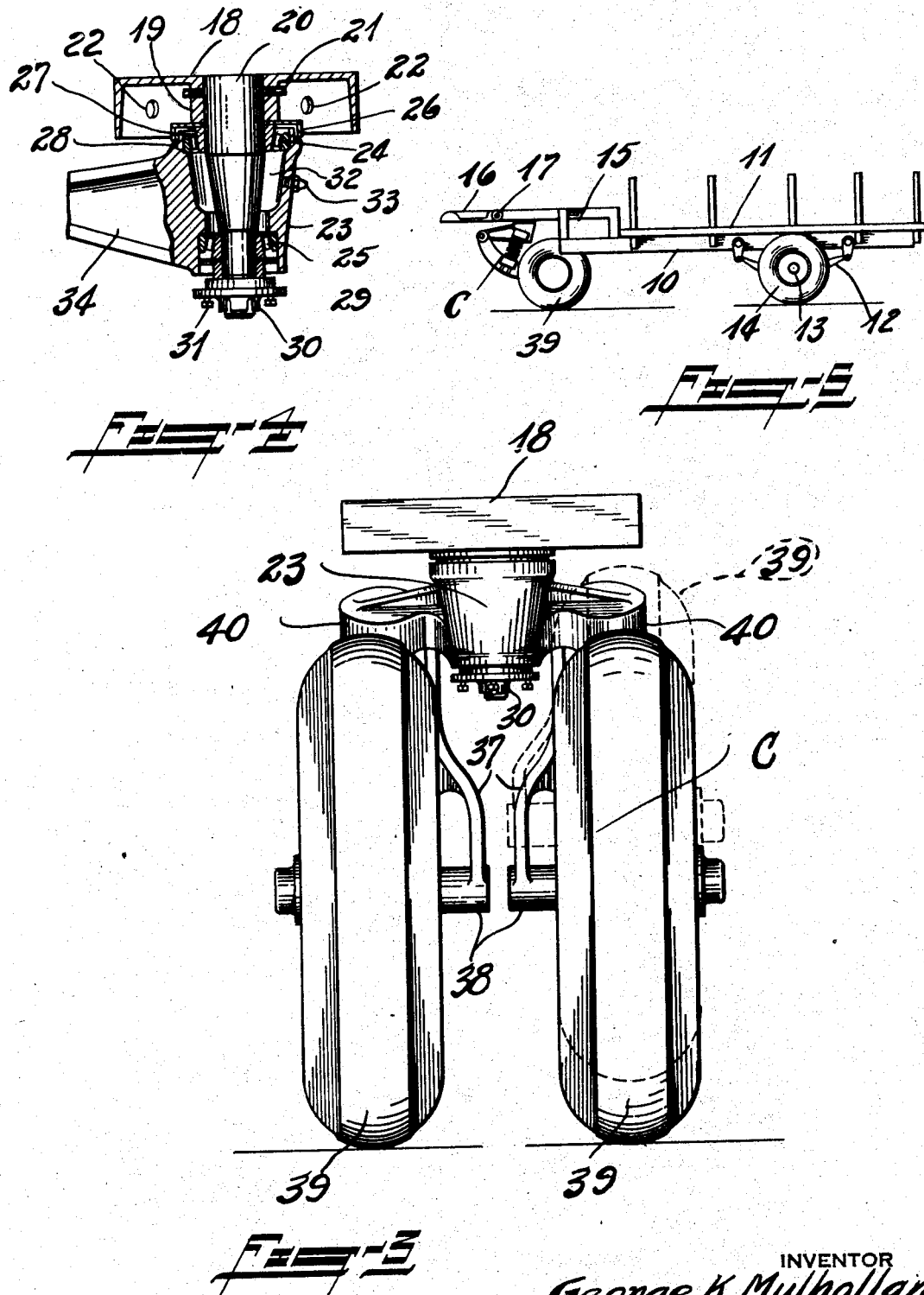

Jan. 27, 1942. G. K. MULHOLLAND 2,271,304
TRAILER UNIT
Filed Jan. 8, 1940 3 Sheets-Sheet 3
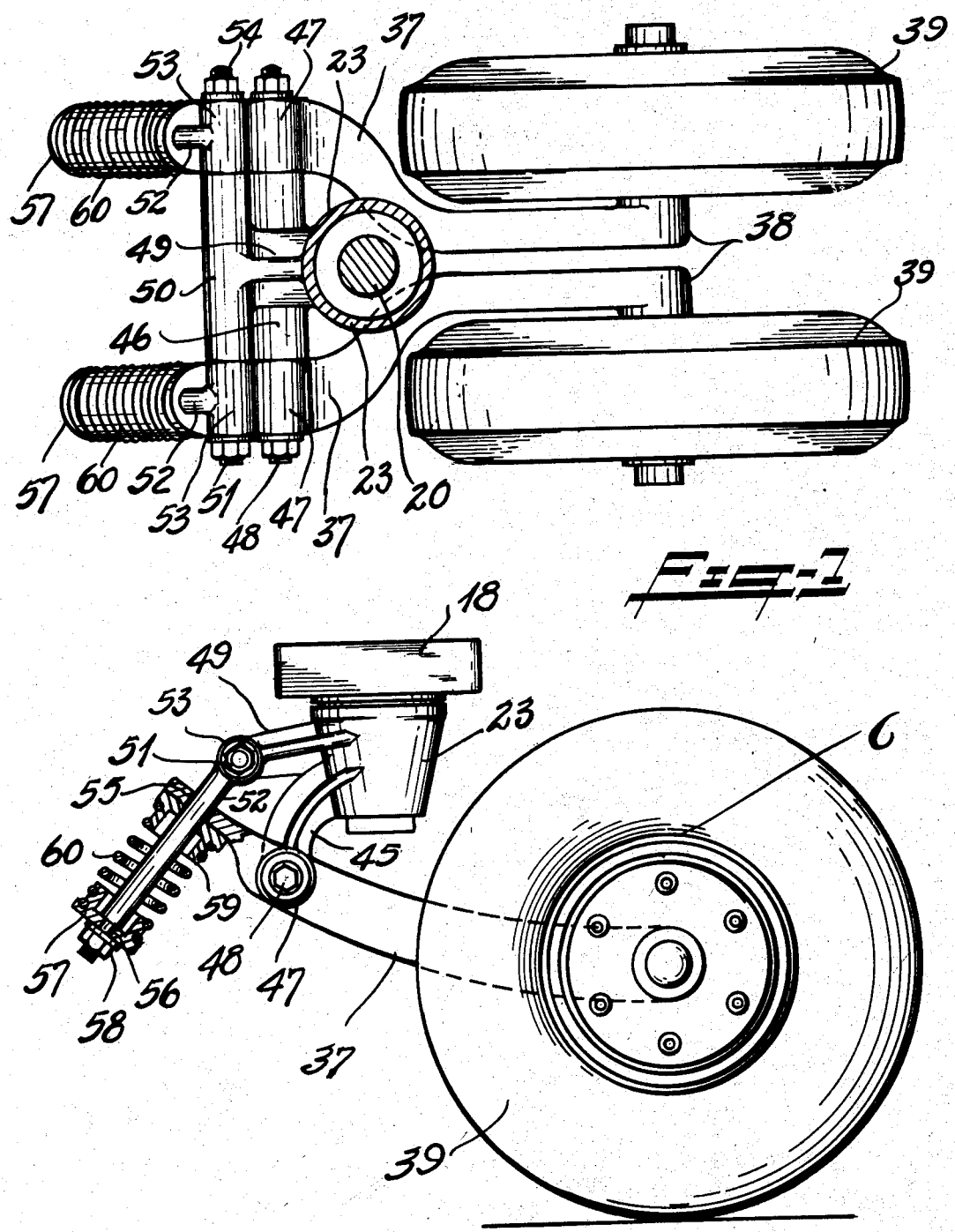
INVENTOR
George K. Mulholland.
BY Frank C. Karman
ATTORNEY Patented Jan. 27, 1942

2,271,304

UNITED STATES PATENT OFFICE 2,271,304

TRAILER UNIT

George K. Mulholland, Saginaw, Mich.

Application January 8, 1940, Serial No. 312,887

5 Claims. (Cl. 16—44)

This invention relates to vehicle construction and more particularly to a construction for a caster unit forming part of a trailer adapted to be connected to and drawn by a power vehicle.

One of the prime objects of the invention is to design a multiple wheeled caster unit, so constructed and arranged that each wheel is independently sprung.

Another object is to provide a trailing unit of simple, practical, and inexpensive construction which can be easily and quickly attached or detached, and which is economical to manufacture and assemble.

A further object is to provide a trailer construction including a swiveled caster wheel mounting which will not twist or bind, and in which either wheel is free to raise or lower with relation to its companion wheel.

A still further object is to provide a trailer unit including multiple wheels arranged to caster about a common stem so that one wheel may ride over a raised obstacle, or drop into a depression without binding or twisting the wheel assembly, and in which each wheel will carry its proportionate load at all times.

A further object still is to design a trailer having a swiveled caster wheel support so that it backs up, turns as a unit with the vehicle to which it is attached, and in fact operates as an integral extension of the power vehicle.

Other objects are also comprehended by my invention, all of which together with the precise nature of my improvements, will be readily apparent when the following description and claims are considered with reference to the accompanying drawings which form part of the specification.

In the drawings:

Fig. 1 is a side elevational view showing my improved caster unit.

Fig. 2 is a top plan view, the attaching bracket being broken away to more clearly show the construction.

Fig. 3 is a rear elevational view, the broken lines showing one of the wheels raised for passing over an obstacle.

Fig. 4 is a fragmentary vertical sectional view showing the stem, bracket, and hub mounting.

Fig. 5 is a side elevational view showing a three-point suspension trailer unit.

Fig. 6 is a side elevational view showing a modified construction of the caster unit.

Fig. 7 is a top plan view thereof.

Conventional caster units used in connection with trailers etc., are arranged for swiveling action about a center stem or pin, and where more than one wheel is employed, they are mounted as a unit, so that when one wheel rides over an obstacle in a roadway, it assumes the greater portion of the total load, while the companion wheel carries the balance of the load; and inasmuch as these wheels are disposed in a plane on opposite sides of the vertical center of the center stem, such condition tends to bind and impose a tortional twist and binding of the hub and associated parts, and this undesirable condition I have eliminated in my improved construction as will be hereinafter more fully described.

Referring now more particularly to the drawings in which I have shown my improved construction. The numeral 10 indicates the conventional frame of a three-point suspension trailer. This is preferably fabricated from structural shapes properly welded together and a body 11 is mounted thereon as usual, the rear end being resiliently supported on springs 12 from an axle 13, which axle is mounted on wheels 14 as usual. The forward end of the frame is formed with a kick up 15, and the swiveled caster unit C is secured thereto in any approved manner.

A trailer tongue 16 is pivotally connected to this kick up at the point 17, and is provided with a suitable ball and socket or trailer hitch (not shown) for attaching to a power vehicle in the conventional manner.

The caster unit proper comprises a flanged bracket 18, having a centrally disposed hub 19 formed integral therewith in which a vertically disposed stem 20 is rigidly mounted and secured by means of the pin 21. Openings 22 are provided in the bracket flanges as shown to facilitate mounting and securing the bracket to the kick-up frame.

A hub member 23 is revolvably mounted on the stem 20 and includes anti-friction bearing assemblies 24 and 25 respectively. A bearing seal or cap 26 being mounted on the cone 27 which forms the inner shell of the bearing raceway, and the upper end of hub is shouldered as at 28 so that a reasonably close joint is provided.

The lower end of the hub 23 is bored as at 29 and accommodates the bearing assembly 25, the lower end of the stem being threaded to receive a flanged nut 30 so that the hub is securely held in position, set screws 31 being mounted in the flange of this nut and permit adjustment to take up bearing wear and adjustment etc. A centrally disposed chamber 32 is provided in the hub 23 and serves as a grease reservoir into which lubricant is introduced through the fitting 33.

A forwardly projecting arm 34 is cast integral with the hub 23 and terminates in a transversely disposed bearing 35 as shown, said bearing being bored to accommodate the bolt 36 and by means of which the rearwardly projecting wheel bearing members 37 are pivotally secured thereto, the opposite ends of said wheel bearing members terminating in an extension hub 38 on which a wheel assembly 39 is revolvably mounted in any approved manner.

Internally threaded spring seats 40 are cast integral with the hub 23, and similar seats 41 are provided on the wheel bearing member as shown, coil springs 42 being mounted in these seats, and bumpers 43 and 44 respectively are provided in the respective spring seats 40 and 41, and these can be formed of rubber or other resilient material to eliminate sharp hammer blows when traveling over uneven roadways when the trailer is loaded beyond the capacity of the springs 42. The fact that each wheel is independently sprung eliminates any possibility of binding when one wheel drops into a rut or rides over an obstacle, and it further insures each wheel carrying its proper proportionate share of the total load.

I wish to direct attention to the fact that the hub is freely revolvable about the stem 20 and the pivotal connection of the wheel bearing members 37 to the end of the arm 34 permits the structure to raise and lower with relation to the ground engaging wheel as the spring is flexed.

In Figs. 6 and 7 of the drawings I have shown a slightly modified construction, a downwardly projecting arm 45 being cast integral with the hub 23 and terminates in a bearing 46 as usual, a bearing 47 is cast integral with each of the wheel bearing members 37 at a point intermediate its length, and a bolt 48 serves to pivotally secure these wheel bearing members to the bearing 46 which forms a part of the hub.

A laterally projecting arm 49 is cast integral with the hub 23 and terminates in a bearing 50, and a horizontally disposed bolt 51 is mounted in said bearing, individual rods 52 are mounted on said bolts, the upper ends of each rod being formed with a bearing 53, which is revolvably mounted on the bolt 51 and nuts 54 serve to secure the members in assembled relation.

The wheel bearing members 37 project beyond the bearings 47 as shown, and an opening 55 is provided in the outer end of each member and through which the rod members 52 extend, the lower end of each rod being shouldered as at 56, and an externally threaded spring cup 57 is mounted thereon, the end of the rod being threaded to receive a nut 58 as usual.

A similar spring cup 59 is provided adjacent the end of the wheel bearing member 37 and a spring 60 is interposed between and threaded on the spring cups, so that when the wheel passes over a raised obstacle in the roadway the spring will be compressed accordingly. Each assembly is identical and each wheel is independently sprung.

From the foregoing description it will be obvious that I have perfected a very simple, practical, and economical trailer caster unit construction in which each wheel is individually sprung, which accommodates itself to the contour of the roadway over which the vehicle travels without binding or strain on the associated parts; which travels accurately and true at high speeds; and in which the load is evenly distributed at all times.

What I claim is:

1. A trailer unit having a frame adapted to be connected to a vehicle, a multi-wheeled caster unit including a stem connected to said frame, a hub revolvable on said stem, and individual independently sprung wheel bearing members pivotally connected to said hub about a common center to permit each wheel to raise and lower with relation to and without affecting the companion wheel.

2. A trailer unit having a frame adapted to be connected to a vehicle and including a bracket, a vertically disposed stem mounted therein, a hub revolvably mounted on said stem, individual individually sprung wheel bearing members pivotally connected to said hub, to permit each wheel bearing member to raise and lower with relation to and without affecting the companion wheel bearing member.

3. A trailer unit adapted to be connected to a vehicle and including a multi-wheeled caster unit comprising a bracket, a stem connected to said bracket, a hub revolvably mounted on said stem and having an outwardly projecting arm formed integral therewith, rearwardly extending wheel bearing members pivotally connected to said arm about a common center, each member being provided with a ground engaging wheel on the free end thereof, and an independent spring interposed between each wheel bearing member and the hub.

4. A trailer unit adapted to be connected to a vehicle and including a multi-wheeled caster unit comprising a vertically disposed stem, a hub revolvably mounted on said stem and provided with an outwardly projecting arm, closely spaced individual wheel bearing members pivotally secured to said arm and provided with ground engaging wheels on the free ends thereof, spring seats on the hub and wheel bearing members respectively, and springs mounted in said spring seats.

5. A trailer unit adapted to be connected to a vehicle and including a multi-wheeled caster unit comprising a bracket, a vertically disposed stem, a hub revolvably mounted thereon, independent wheel bearing members pivotally connected to said hub, and resilient means associated with said hub and with each wheel bearing member for independently springing each of said members to permit each wheel bearing member to raise and lower without affecting the companion member.

GEORGE K. MULHOLLAND.